United States Patent
Jess et al.

(10) Patent No.: US 8,287,723 B2
(45) Date of Patent: Oct. 16, 2012

(54) BIOMASS PYROLYSIS IN REFINERY FEEDSTOCK

(75) Inventors: Andreas Jess, Bayreuth (DE); Dominic Kaufmann, Tettau/Langenau (DE); Daren E. Daugaard, Houston, TX (US)

(73) Assignee: Phillips 66 Company, Houston, TX (US)

(*) Notice: Subject to any disclaimer, the term of this patent is extended or adjusted under 35 U.S.C. 154(b) by 0 days.

(21) Appl. No.: 13/014,490

(22) Filed: Jan. 26, 2011

(65) Prior Publication Data
US 2011/0184215 A1 Jul. 28, 2011

Related U.S. Application Data

(60) Provisional application No. 61/299,906, filed on Jan. 29, 2010.

(51) Int. Cl.
*C10G 1/00* (2006.01)
(52) U.S. Cl. ........ 208/434; 208/404; 208/417; 585/240; 585/242; 44/605; 44/606; 201/2; 201/5; 201/8; 201/10; 201/20
(58) Field of Classification Search ............. 585/240, 585/242; 201/8, 23, 2, 5, 10, 20; 44/605–606; 208/404, 417, 434
See application file for complete search history.

(56) References Cited

U.S. PATENT DOCUMENTS

| 4,145,188 | A | * | 3/1979 | Espenscheid et al. ........ 585/240 |
| 4,521,292 | A | | 6/1985 | Spars et al. |
| 5,904,838 | A | | 5/1999 | Kalnes et al. |
| 2008/0149896 | A1 | | 6/2008 | Lenglet et al. |
| 2009/0218062 | A1 | | 9/2009 | Schinski et al. |
| 2009/0253948 | A1 | | 10/2009 | McCall et al. |
| 2010/0147743 | A1 | | 6/2010 | MacArthur et al. |
| 2010/0212215 | A1 | | 8/2010 | Agblevor |

FOREIGN PATENT DOCUMENTS
WO PCT/US11/22592 2/2011

OTHER PUBLICATIONS

Hou, B. et al. (2007). Petroleum Science and Technology, 25, 1013-1025.*
Vanasse, C. et al. (1988). The Canadian Journal of Chemical Engineering, 66, 112-120.*
Elliott, D.C. et al. (1991). Energy & Fuels, 5, 399-410.*

* cited by examiner

*Primary Examiner* — Brian McCaig
(74) *Attorney, Agent, or Firm* — Boulware & Valoir

(57) ABSTRACT

This invention relates to biomass pyrolysis through the use of a hot liquid refinery feedstock as a heat transfer medium, preferably a vacuum gas oil feedstock.

15 Claims, 3 Drawing Sheets

BIOMASS PYROLYSIS IN REFINERY FEEDSTOCK

CROSS REFERENCE TO RELATED APPLICATIONS

This application claims priority to 61/299,906, filed Jan. 29, 2010, and incorporated herein in its entirety.

FEDERALLY SPONSORED RESEARCH STATEMENT

Not applicable.

REFERENCE TO MICROFICHE APPENDIX

Not applicable.

FIELD OF THE INVENTION

This invention relates to pyrolysis, and more particularly to a method for pyrolytically processing biomass material into useful byproducts through the use of a refinery feedstock as a heat transfer medium and/or source of hydrogen for hydrodeoxygenation.

BACKGROUND OF THE INVENTION

Pyrolysis is the chemical decomposition of a condensed substance by heating. The word is coined from the Greek-derived elements pyro—meaning "fire"—and lysis—meaning "decomposition." Pyrolysis is a special case of thermolysis, and is most commonly used for organic materials. It occurs spontaneously at high temperatures (above 300° C. for wood), for example in wildfires or when vegetation comes into contact with lava in volcanic eruptions. Pyrolysis generally does not involve reactions with oxygen, but can occur in the presence of oxygen. Extreme pyrolysis, which leaves only carbon as the residue, is called carbonization and is also related to the chemical process of charring.

"Pyrolysis oil," also known as "bio-oil," is a synthetic fuel under investigation as substitute for petroleum. Generally speaking, pyrolysis has three main products which include bio-oil, char and various non-condensable gases ($H_2$, $CO$, $CO_2$, $CH_4$). The char and non-condensable gases may be recovered and burned to supply energy to the system, but the condensable gases are rapidly cooled to form condensate droplets that can then be separated from the non-condensable gases due to the substantial difference in boiling points. The composition of two exemplary bio-fuels produced by pyrolysis is shown below:

|  | White Spruce | Poplar |
| --- | --- | --- |
| Moisture content, wt % | 7.0 | 3.3 |
| Particle size, μm (max) | 1000 | 590 |
| Temperature | 500 | 497 |
| Apparent residence time | 0.65 | 0.48 |
| Product Yields, wt %, m.f. | | |
| Water | 11.6 | 12.2 |
| Gas | 7.8 | 10.8 |
| Bio-char | 12.2 | 7.7 |
| Bio-oil | 66.5 | 65.7 |
| Bio-oil composition, wt %, m.f. | | |
| Saccharides | 3.3 | 2.4 |
| Anhydrosugars | 6.5 | 6.8 |
| Aldehydes | 10.1 | 14.0 |
| Furans | 0.35 | — |
| Ketones | 1.24 | 1.4 |
| Alcohols | 2.0 | 1.2 |
| Carboxylic acids | 11.0 | 8.5 |
| Water-Soluble-Total Above | 34.5 | 34.3 |
| Pyrolytic Lignin | 20.6 | 16.2 |
| Unaccounted fraction | 11.4 | 15.2 |

Source: Piskorz, J., et al. In Pyrolysis Oils from Biomass, Soltes, E. J., Milne, T. A., Eds., ACS Symposium Series 376, 1988.

Since pyrolysis is endothermic, heat transfer considerations dominate the design of pyrolysis reactors. Direct heat transfer with a hot gas (which can be recycled) is possible in a pyrolysis reactor, but it is difficult to provide enough heat with reasonable gas flow-rates due to the low specific heat of a relatively thin gas. Indirect heat transfer with exchange surfaces (such as vessel walls) is also possible, but it is difficult to achieve good heat transfer on both sides of the heat exchange surface, and these methods are not easily scaled up.

Another method of providing heat is direct heat transfer with a circulating hot solid. This is an effective method, but the technology for moving, recovering, and reheating the solid can be complex. Auger technology employs hot sand (for example) and biomass particles that are fed into one end of a screw. The screw mixes the sand and biomass and conveys them along the screw length. It provides a good control of the biomass residence time and does not dilute the pyrolysis products with a carrier or fluidizing gas. However, the sand must be reheated in a separate vessel, and mechanical reliability is a concern. Thus, there has been no large-scale commercial implementation of the auger technology.

Rotating cones have also been used to introduce and mix hot solids with the comminuted biomass. Pre-heated hot sand and biomass particles are introduced into a rotating cone, and the mixture of sand and biomass is transported across the cone surface by centrifugal force due to the rotation. Like other shallow transported-bed reactors, relatively fine particles are required to obtain a good liquid yield, and there have been no large scale commercial implementation of this technology.

Fluidized beds have also been used, whereby biomass particles are introduced into a bed of hot sand fluidized by a gas, which is usually a recirculated product gas. High heat transfer rates from fluidized sand result in rapid heating of biomass particles. There is some ablation by attrition with the sand particles, but it is not as effective as in the ablative processes (not described herein). Heat is usually provided by heat exchanger tubes through which hot combustion gas flows. There is some dilution of the products, which makes it more difficult to condense and then remove the bio-oil mist from the gas exiting the condensers. The main challenges have been in improving the quality and consistency of the bio-oil, but this process has been scaled up by companies such as Dynamotive and Agri-Therm.

Circulating fluidized beds are yet another possibility. Biomass particles are introduced into a circulating fluidized bed of hot sand. Gas, sand and biomass particles move together, with the transport gas usually being a recirculated product gas. High heat transfer rates from sand ensure rapid heating of biomass particles and ablation is stronger than with regular fluidized beds. A fast separator separates the product gases and vapors from the sand and char particles. The sand particles are reheated in fluidized burner vessel and recycled to the reactor. Although this process can be scaled up, it is rather complex and the products are much diluted, which greatly complicates the recovery of the liquid products.

What is needed in the art is a method for pyrolizing biomass with higher conversion rates at lower temperatures, that can be scaled up and is cost effective to perform. Embodiments of the invention, which combines the biomass with a refinery feedstock prior to pyrolysis, meets these needs.

SUMMARY OF THE INVENTION

The invention relates to an improved method of biomass pyrolysis, wherein the heat source is a hot petroleum feedstock, which provides heat and may also contribute organic material to the pyrolysis reaction. Biomass pyrolysis in a petroleum feedstock, such as vacuum gas oil (VGO), rather than with a solid heat source such as sand or salt, improves pyrolysis because the hot hydrocarbon liquid is readily available from other processes, thus improving cost and efficiency, is easily admixed with the biomass, and provides very high heat transfer rates and 100% conversion. It also simplifies the mechanics of the operation, since existing plumbing and fixtures will suffice to deliver and mix the hot petroleum feedstock with the biomass particles.

Generally speaking, biomass of sufficient size of 5 mm or less is injected into the hot petroleum feedstock at typical reaction temperatures between 250 and 500° C., and preferably less than 500° C., at pressures ranging from near atmospheric to 20 MPa. Upon initial contact between the biomass particle and liquid medium, the biomass undergoes devolatilization generating char, condensable vapors that can be collected overhead as liquids, and non condensable gas or gases.

The advantage of this process is that it utilizes an organic (a hydrocarbon or "HC" base) liquid media to achieve heat transfer. The invention improves heat transfer to the biomass particle resulting in improved product yield, and the resulting bio-oil is of higher quality due to thermochemical interaction with the hot petroleum feedstock. The reaction temperature may also be decreased significantly from common fast pyrolysis temperatures (500° C.), thus further improving efficiencies and cost.

In a preferred embodiment, the hot petroleum feedstock is vacuum gas oil or "VGO." Other hot petroleum feedstocks can be used, depending on current economics and availability, and include heavy gas oil, diesel fuel, fuel oils, lubricating oils, asphalt, waste oils, and the like.

Certain embodiments of the invention provide a method of pyrolizing biomass with refinery feedstock In a preferred embodiment, a method of preparing a hydrocarbon liquid fuel includes the steps of: (a) mixing biomass particles together with a hot liquid refinery feedstock that is less than 500° C. and serves as a heat source for pyrolizing the biomass particles; and (b) recovering a hydrocarbon oil pyrolysis product.

In an alternate embodiment, a method of pyrolizing biomass includes: (a) mixing biomass particles of less than 5 mm together with a hot refinery feedstock liquid that is less than 500° C.; and (b) pyrolizing the biomass particles. Both methods preferably occur with following conditions: (1) the temperature of the a hot refinery feedstock is between 250° C. to 350° C.; (2) the refinery feedstock is vacuum gas oil; and (3) the biomass particles are preferably 2 mm or less in size. In preferred embodiments, the pyrolysis is conducted in the absence of oxygen. In alternate embodiments, the pyrolysis reaction is conducted in the presence of an inert gas.

DESCRIPTION OF EMBODIMENTS OF THE INVENTION

In one embodiment of the invention, a method of producing hydrocarbons from pyrolizing a biomass stream using a hot refinery feedstock liquid as the heat transfer medium is described. A hot refinery feedstock, particularly vacuum gas oil (VGO), may also act as a hydrogen donor during the pyrolysis.

Figure 1:
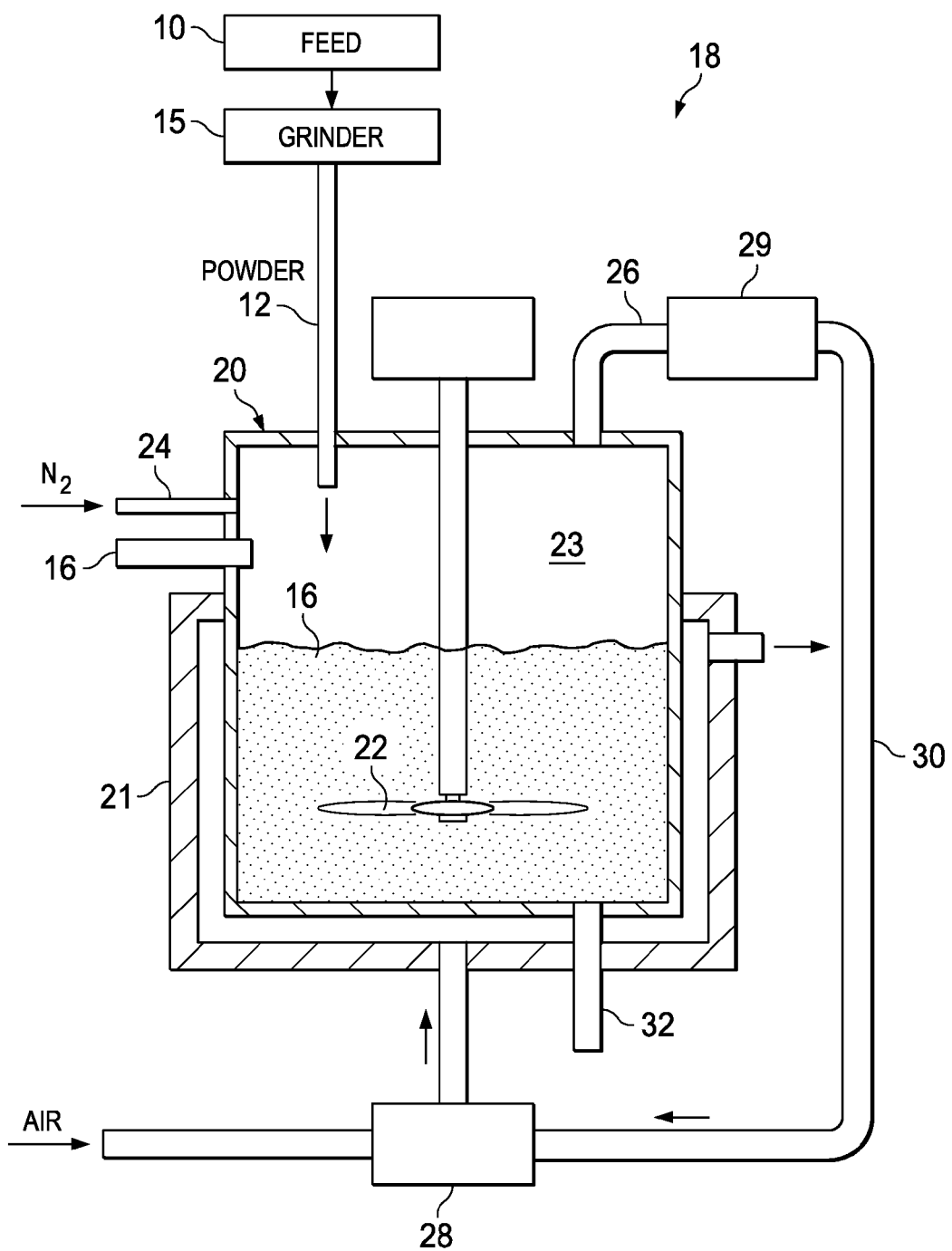
FIG. 1 is an embodiment of a biomass pyrolysis reactor.

Referring now to FIG. 1, biomass 10 is ground to a powder 12 in a suitable grinding apparatus 15 such as a ball mill, hammer mill, roller mill, stone mill, disc mill, knife mill, Raymond grinder and the like. The powder 12 is preferably ranges from about 1, 2, 3, 4, or 5 mm, depending on the material. Smaller (<1 mm) and larger (7, 10, 12, 15 mm and greater) size are also possible, depending on the economics and the material, but it is preferred that the particle be less than about 5 mm in most cases, more preferably less than 2 mm or 1 mm, and most preferably less than 500 µm.

The powder 12 is then fed to an amount of refinery feedstock 16 contained within pyrolysis unit 18. The pyrolysis unit 18 may be such as that described in U.S. Pat. No. 4,064,018, U.S. Pat. No. 4,584,947, U.S. Pat. No. 5,411,714, US2009064583, US2009008292, US2008197012, WO2008020167, WO2009014436, and the like (each incorporated by reference), some of which will have to be modified to allow the use of a liquid heat source. In an alternate embodiment, the refinery feedstock 16 may be continuously fed to the pyrolysis unit 18. In yet another alternate embodiment, the refinery feedstock 16 and the biomass powder 12 may be premixed and injected into the pyrolysis unit 18.

In a preferred embodiment, the pyrolysis unit 18 includes a reactor 20, a heating means such as a combustion gas jacket 21 and a stirrer 22. The pyrolysis unit 18 may further be provided with a condenser 29. Pyrolysis is generally conducted in the absence of oxygen. Upon initial contact between the powder 12 and the refinery feedstock 16, the biomass undergoes devolatilization, generating solids often termed char, condensable vapors and non-condensable gases.

In an alternate embodiment, the powder 12 may be dried at a moderate temperature from 30° C.-70° C., if necessary, before being fed to the pyrolysis unit. An inert gas, such as nitrogen, can be fed into the headspace 23 through inlet 24. The nitrogen gas can be utilized to sweep gases developed during pyrolysis through gas outlet 26. The condensable gases produced by pyrolysis are quenched by the condenser unit 29 and collected as bio-oil. The non-condensable gases may include carbon monoxide (CO), carbon dioxide ($CO_2$), methane ($CH_4$), hydrogen ($H_2$) and oxygen ($O_2$). The gases can be utilized to support the pyrolysis temperature by delivery to a combustion unit 28 through line 30 or can be recovered for future use.

In alternate embodiments, the gases may be further processed in a Fischer-Tropsch reactor. A liquid oil product along with char is recovered through outlet 32 at the end of the run. The liquid oil product is a pyrolysis oil having both a hydrocarbon based phase and biomass based phase. In some embodiments, the liquid oil product may contain acids, esters, alcohols, ketones, aldehydes, anhydrosugars, furans, and phenols. The exact composition of the liquid oil product depends on a number of factors, including but not limited to, biomass, reaction temperature, heating rate, residence time, and quench rate.

The refinery feedstock 16 functions as a massive, thermal sink. The refinery feedstock 16 is an excellent heat transfer media and promotes much higher heat transfer rates and substantially 100% conversion of the biomass. Examples of refinery feedstocks include vacuum gas oil, heavy gas oil, diesel fuel, fuel oils, lubricating oils, asphalt, and the like. However, any hydrocarbon with a corresponding boiling point less than the pyrolysis reaction temperature could be viable. In a preferred embodiment, the heat transfer medium is vacuum gas oil. The refinery feedstock 16 is present in excess as compared to the biomass.

The temperature of the pyrolysis unit 18 is preferably less than about 500° C., more preferably from about 250° C. to about 500° C., and even more preferably from about 400° C. to about 500° C. In a preferred embodiment, the temperature ranges from about 250° C. to about 350° C. At lower temperatures, limited or no biomass conversion may occur and at higher temperatures, there may be limited liquid production with an increase in non-combustible gas and coke production. The pressure of the pyrolysis unit 18 preferably ranges from atmospheric to 20 MPa. At lower pressures, chemical interaction of hydrocarbon and biomass may be limited and at higher pressures, chemical interaction of hydrocarbon and biomass may be promoted.

The process of the invention utilizes biomass 10 which produces hydrocarbons. Examples of biomass 10 include trees, shrubs, wood residue such as sawdust, bark, and wood products, municipal solid waste, paper, cardboard, food waste, yard wastes such as leaves and grass clippings, plastics, tires, livestock waste, organic process waste, sewage, crops such as starch or sugar crops (corn, wheat, barley, cane, beets), forage crops (grasses, alfalfa, clover, switchgrass and the like), oilseed crops (soybean, sunflower, safflower), and waste therefrom (such as straw and husks), as well as aquatic plants such as algae, water weed, water hyacinth, reed and rushes, and the like. During pyrolysis, the refinery feedstock may act as a hydrogen donor and in-situ hydrogen deoxygenation of the biomass products may occur.

EXAMPLE 1

Figure 2:
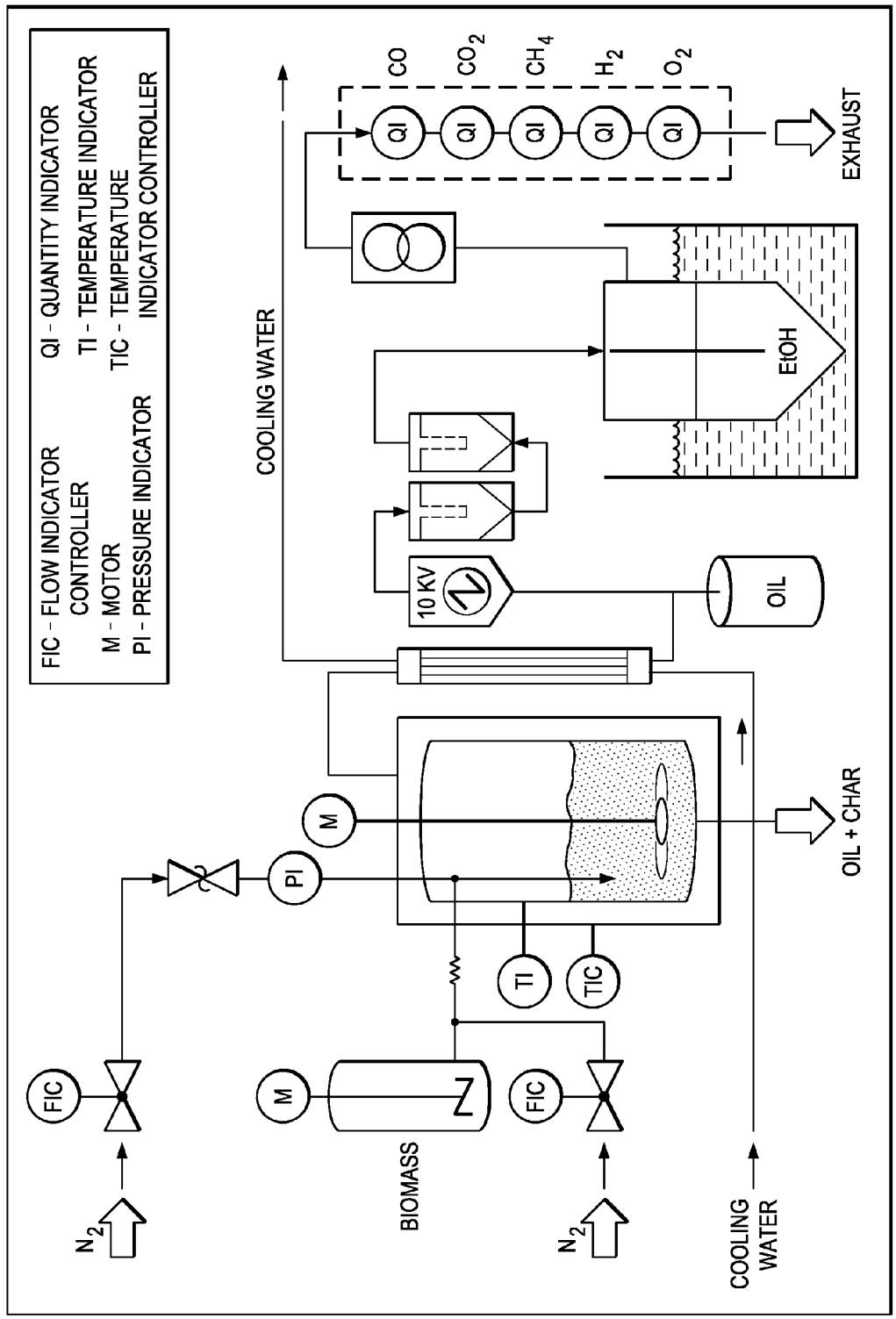
FIG. 2 is an embodiment of a laboratory scale biomass pyrolysis reactor used in Example 1.

FIG. 2 is an embodiment of a laboratory scale biomass pyrolysis reactor used in this Example. The biomass pyrolysis reactor was electrically heated and had a condenser train after the reactor.

Figure 3:
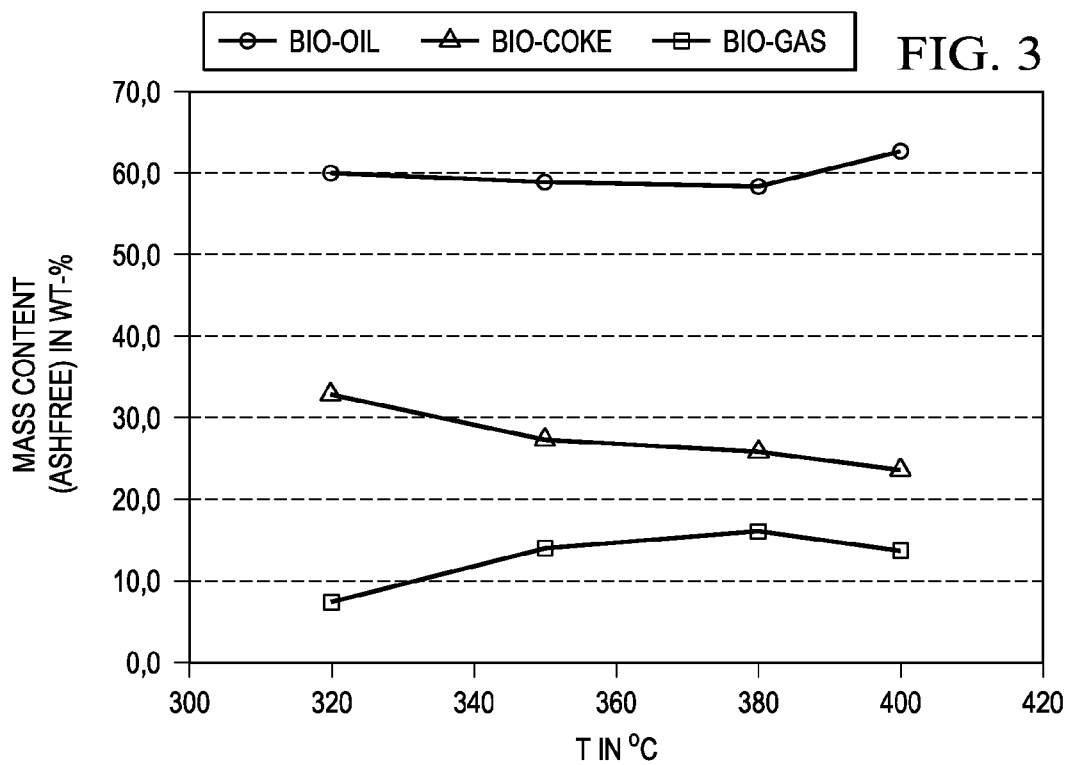
FIG. 3 is a chart showing the product distribution of Example 1.
Figure 4:
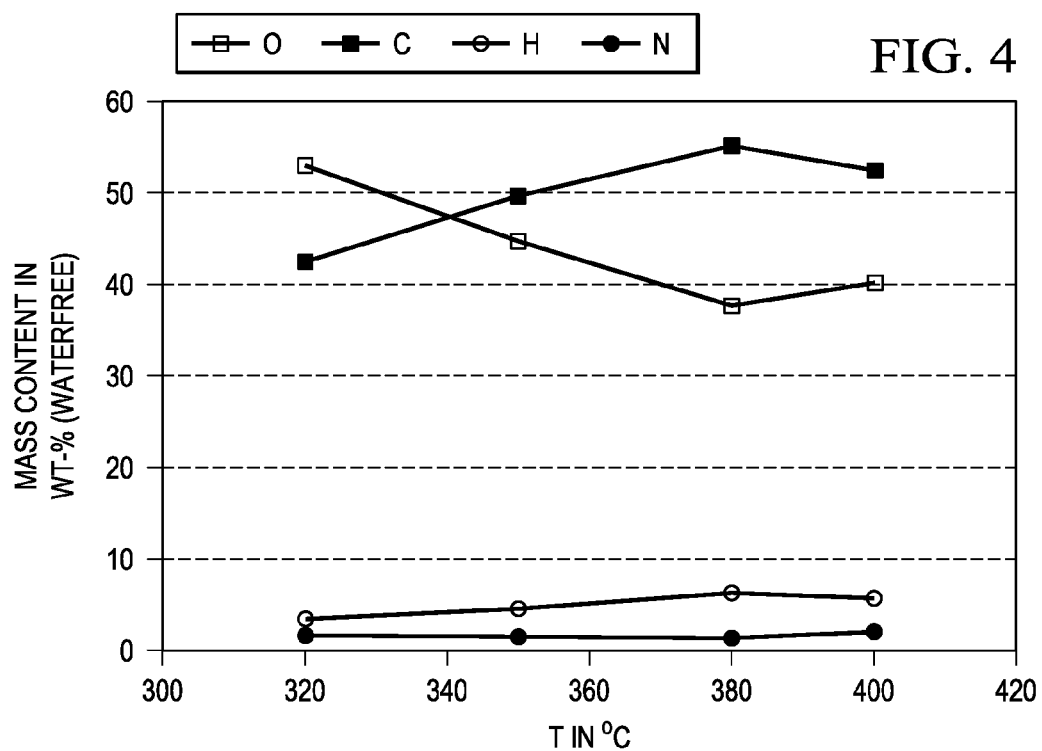
FIG. 4 is a chart showing the elementary analysis of the bio-oil of Example 1.

With switch grass as the biomass and VGO as the refinery feedstock, experiments were performed at temperatures of about 320° C., about 350° C., about 380° C. and about 400° C. The average biomass feed rate was about 217 g/h with a nitrogen flow rate of about 50 l/h. The refinery feedstock was fed into a conveyor tube at a flow of about 15 l/h. The experiments lasted typically from about 1 to about 2 hours. FIG. 3 is a chart for the product distribution and FIG. 4 is an elementary analysis of the bio-oil.

While a number of particular embodiments of the present invention have been described herein, it is understood that various changes, additions, modifications, and adaptations may be made without departing from the scope of the present invention, as set forth in the following claims.

What is claimed is:

1. A method of preparing a hydrocarbon comprising the steps of:
    mixing biomass particles together with a hot refinery feedstock that is less than 500° C. and serves as a heat source for pyrolyzing the biomass particles; and recovering a hydrocarbon oil pyrolysis product that is about 60% bio-oil, wherein the hot refinery feedstock serves as the sole heat source for the method.

2. The method according to claim 1 wherein the temperature of the hot refinery feedstock is between 250° C. to 350° C.

3. The method according to claim 1 wherein the hot refinery feedstock is vacuum gas oil.

4. The method according to claim 1 wherein biomass particles are 2 mm or less in size.

5. The method according to claim 1 wherein pyrolysis is conducted in the absence of oxygen.

6. The method according to claim 1 in which the reaction is conducted in the presence of an inert gas.

7. A method of pyrolyzing biomass, said method comprising mixing biomass particles of less than 5 mm together with a hot refinery feedstock that is less than 500° C. and serves a heat source for pyrolyzing the biomass particles; and pyrolyzing the biomass particles to produce a hydrocarbon oil pyrolysis product that is about 60% bio-oil, wherein the hot refinery feedstock serves as the sole heat source for the method.

8. The method according to claim 7 wherein the temperature of the hot refinery feedstock is between 250° C. to 350° C.

9. The method according to claim 7 wherein the hot refinery feedstock is vacuum gas oil.

10. The method according to claim 7 wherein biomass particles are 2 mm or less in size.

11. The method according to claim 7 wherein pyrolysis is conducted in the absence of oxygen.

12. The method according to claim 7 in which the reaction is conducted in the presence of an inert gas.

13. A method of preparing a hydrocarbon comprising the steps of:
    mixing biomass particles together with a hot refinery feedstock that is less than 500° C. and serves as a heat source for pyrolyzing the biomass particles, and recovering a hydrocarbon oil pyrolysis product that is bio-oil, bio-coke, and bio-gas, wherein the hot refinery feedstock serves as the sole heat source for the method.

14. The method of claim 13, wherein the biomass particles are less than 5 mm in size, the hot refinery feedstock is between 250° C. to 350° C., and where the reaction is conducted in the presence of an inert gas for 1 to 2 hours.

15. A method of preparing a hydrocarbon comprising the steps of:
    mixing biomass particles together with a hot refinery feedstock that is less than 500° C. and
    serves as a heat source for pyrolyzing the biomass particles, and
    recovering a hydrocarbon oil pyrolysis product that is about 60% bio-oil,
    wherein said hot refinery feedstock comprises vacuum gas oil.

* * * * *